United States Patent
Palzer et al.

(10) Patent No.: US 12,185,735 B2
(45) Date of Patent: Jan. 7, 2025

(54) BEVERAGE COMPOSITION USEFUL IN BEVERAGE CAPSULES

(71) Applicant: SOCIÉTÉ DES PRODUITS NESTLÉ S.A., Vevey (CH)

(72) Inventors: Stefan Palzer, Lausanne (CH); Marie-Laure Jung, Saint-Legier (CH); Celine Sarrazin-Horisberger, Suchy (CH); Amrit Maharaj, Dublin, OH (US); Gerhard Niederreiter, Vevey (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 18/223,301

(22) Filed: Jul. 18, 2023

(65) Prior Publication Data

US 2023/0354843 A1 Nov. 9, 2023

Related U.S. Application Data

(62) Division of application No. 16/462,288, filed as application No. PCT/EP2017/082791 on Dec. 14, 2017, now abandoned.

(60) Provisional application No. 62/438,578, filed on Dec. 23, 2016.

(51) Int. Cl.
*A23F 5/40* (2006.01)
*A23F 5/26* (2006.01)
*B65D 85/804* (2006.01)

(52) U.S. Cl.
CPC .............. *A23F 5/405* (2013.01); *A23F 5/26* (2013.01); *B65D 85/8043* (2013.01)

(58) Field of Classification Search
CPC .... A23F 5/26; A23F 5/262; A23F 5/36; A23F 5/28; A23F 5/08; A23F 5/04; A23F 5/18; A23F 5/24; A23F 5/00; A23F 5/145; A23F 5/50; A23F 5/10; B65D 85/8043; B65D 85/8046; B65D 2203/00; B65D 2203/06; B65D 81/18; B65D 85/804; B65D 17/404; B65D 2517/002; B65D 2565/388; B65D 2581/3409; B65D 65/38; B65D 81/2076; B65D 81/24; B65D 81/3461; B65D 85/8055; B65D 85/8061; B65D 85/808; A23L 27/28; A23L 2/39
See application file for complete search history.

(56) References Cited

U.S. PATENT DOCUMENTS

| 2,162,272 | A | | 12/1937 | Patterson |
| 2,110,732 | A | | 3/1938 | Kane |
| 2,599,682 | A | | 6/1952 | Wirtel et al. |
| 4,806,375 | A | * | 2/1989 | Favre ............... A47J 31/32 99/302 R |
| 6,345,570 | B1 | * | 2/2002 | Santi ............... A47J 31/368 99/289 R |
| 2003/0026883 | A1 | | 2/2003 | Bunke et al. |
| 2006/0230944 | A1 | | 10/2006 | Neace, Jr. et al. |
| 2016/0362246 | A1 | | 12/2016 | Garcin et al. |
| 2019/0274329 | A1 | | 9/2019 | Mora et al. |

FOREIGN PATENT DOCUMENTS

CN 105636451 6/2016

OTHER PUBLICATIONS

China Patent Office Communication for Application No. 201780072555. 9, dated Mar. 15, 2022, 11 pages.
"India's Major Crops: Coffee", Retrieved from (https://www.gktoday. in/topic/current-coffee-production-in-india/), Sep. 21, 2015, pp. 1-8.
Kolodyazna Ya, "Food Chemistry", 1999, pp. 10-11.
Pucherov, "All about Coffee", Dnepropetrovsk, 2005, pp. 9-10 ancl 19-20.
Russia Patent Office Action Received for Application No. 2019115434, mailed on Mar. 17, 2021, 13 pages.

* cited by examiner

*Primary Examiner* — Hong T Yoo
(74) *Attorney, Agent, or Firm* — K&L Gates LLP

(57) ABSTRACT

Beverage compositions which are useful in beverage capsules may contain roast and ground coffee and dried coffee extract obtained by extracting coffee at a temperature below 60° C. Such capsules are useful for the preparation of coffee beverages in beverage preparation machines.

5 Claims, No Drawings

BEVERAGE COMPOSITION USEFUL IN BEVERAGE CAPSULES

CROSS REFERENCE TO RELATED APPLICATIONS

The present application is a divisional of U.S. patent application Ser. No. 16/462,288 filed May 20, 2019, which is a National Stage of International Application No. PCT/EP2017/082791 filed Dec. 14, 2017, which claims priority to U.S. Provisional Patent Application No. 62/438,578 filed Dec. 23, 2016, the entire contents of which are incorporated herein by reference.

FIELD OF THE INVENTION

The present invention relates to beverage compositions useful in beverage capsules and their preparation, particularly to beverage compositions comprising roast and ground coffee and dried coffee extract obtained by extracting coffee at a temperature below 60° C.

BACKGROUND

Single-serving beverage preparation machines are well known in the food industry and consumer goods domain. Such machines allow a consumer to prepare on command a single serving of a beverage such as drip coffee, espresso coffee, tea, hot chocolate drink, or even liquid foodstuffs such as soup or infant formula. Most beverage preparation machines for in-home use operate according to a system in which beverage ingredients are provided in single-serving portions in individual containers, in particular in the form of a rigid or semi-rigid capsule. Such capsules may be hermetically sealed, so as to maintain the freshness and quality of the beverage ingredient within the capsule until use. To prepare a serving of a beverage, the capsule is first inserted into a beverage-preparation apparatus ("beverage machine") adapted to receive it. The beverage machine comprises a means for conducting water it into the beverage capsule, wherein the water combines with the beverage ingredient to make a beverage. The water is usually heated so as to produce a hot beverage, but may also be ambient or cold. The water may be injected at an elevated pressure (for e.g. espresso coffee capsules), or simply channelled into the capsule at atmospheric pressure (for e.g. drip coffee). Once prepared, the beverage is dispensed from an outlet of the capsule into a waiting container for consumption. The brewing or extraction time, i.e. the time that water is in contact with the beverage ingredients inside the capsule until the beverage has been completely dispensed is normally in the order of seconds or minutes, as it is desired that the beverage is quickly ready.

There is a desire to be able to prepare new beverages, e.g. cold beverages, from beverage capsules. An example of a cold beverage is cold brew coffee. Cold brew coffee is normally produced by extracting coffee for an extended period of time in water at ambient or cold temperature and has a milder and fresher taste and aroma than hot brew coffee. Often the coffee is left in water to extract overnight, e.g. for 24 hours, and seldom for less than 12 hours. Such a process cannot easily be replicated in a single-serve beverage preparation machine with extraction times of at most few minutes, as this will not achieve the desired level of extraction to give sufficient taste and aroma as associated with traditional cold brew coffee. There is thus a need for beverage compositions useful in beverage capsules that allows the fast preparation of coffee beverages with sufficient taste and aroma associated with traditional cold brew coffee.

SUMMARY

The present inventors have found that a beverage capsule with a beverage composition comprising both roast and ground coffee and a dried extract of coffee obtained by extracting roast and ground coffee with water at a temperature below 60° C., is able to deliver a beverage with sufficient taste and aroma of traditional cold brew coffee, when used in a traditional beverage preparation machine with an extraction time of at most a few minutes. It has also been found that beverage compositions only containing roast and ground coffee, or only containing a coffee extract obtained by extracting roast and ground coffee with water at a temperature below 60° C., does not deliver the same aroma intensity. Furthermore, beverage compositions containing only coffee extract produced at low extraction temperature tends to cake and are not stable during storage. Accordingly, the present invention relates to a beverage composition comprising a) roast and ground coffee, and b) a dried coffee extract obtained by extracting roast and ground coffee with water at a temperature below 60° C. In further aspects the invention relates to beverage capsule for a beverage preparation apparatus comprising the beverage composition of the invention, a method of producing a beverage composition of the invention and a method of preparing a coffee beverage in a coffee beverage apparatus.

DETAILED DESCRIPTION

The present invention relates to a beverage composition useful in beverage capsules. By a beverage composition is meant a dry composition, preferably in powder format, useful for the preparation of a beverage by combination with water or another suitable liquid.

The beverage composition comprises roast and ground coffee. Coffee beans are beans, or seeds, from the coffee plant, e.g. from the *Coffea arabica* variety, also called Arabica coffee, or the *Coffea canephora* variety, also called Robusta coffee. Roast and ground coffee is coffee beans that have been subjected to the processes of roasting and grinding commonly used in the field of coffee production. Roasting of green, also called raw, coffee beans may be performed in any suitable way to produce aroma notes associated with roast coffee. Suitable roasting methods are well known in the art. Similarly, methods and equipment for grinding of coffee beans are well known in the art and any suitable method may be used to produce roast and ground coffee beans according to the invention.

The beverage composition also comprises an extract of coffee obtained by extracting coffee with water at a temperature below 60° C. Extraction may be performed in any suitable way and for any suitable time. Methods for extraction of coffee are well known in the art, e.g. for production of soluble, or instant coffee, e.g. from EP 0826308. The extraction may be carried out in any suitable extraction vessel, for example fixed bed reactors or continuous countercurrent extractors. Traditional methods for producing cold brew coffee may be used, e.g. extracting coffee at ambient temperature for 8-24 hours and filtering the extract to remove coffee grounds. Extraction is preferably performed at a temperature between 2° C. and 50° C., such as between 2° C. and 40° C., between 5° C. and 40° C., or between 10° C. and 30° C. Aroma may be removed from the roast and ground coffee before extraction to avoid aroma losses and added back to the extract before drying, methods for removal of aroma are well known in the art of soluble coffee extraction, e.g. from WO 01/13735.

The coffee extract is dried to produce a dry coffee extract, e.g. in the form of a powder. Drying may be performed by any suitable method such as e.g. spray drying, freeze drying or vacuum belt drying. Before drying the coffee extract may be concentrated, e.g. by evaporation, to reduce the amount of water to be removed during the drying step. If not already in the form of a powder after drying, the dried coffee extract is preferably milled into a powder after drying. The powder form facilitates mixing of roast and ground coffee and dried coffee extract within the capsule. The roast and ground coffee and the dried coffee extract is preferably present within the capsule as a powder mixture and not as separate layers.

In a further aspect the invention relates to a beverage capsule for a beverage preparation apparatus, the capsule comprising the beverage composition of the invention. Beverage capsules are well known in the art, and any suitable capsule construction may be used. Suitable capsules are e.g. disclosed in WO03059778 and EP 0512468. The construction of the capsule will depend on the particular beverage machine(s) for which is intended to be used. Several such beverage machines adapted to the preparation of beverages from capsules exists and are well known in the art. The beverage capsule comprises a chamber wherein the roast and ground coffee and the dried coffee extract is present. The chamber may be hermetically sealed or it may be partly open to the environment. Beverage capsules are constructed such that water, or another suitable liquid, can be injected into the chamber where the roast and ground coffee and the dried coffee extract is present so that the dried coffee extract is dissolved and the soluble coffee solids are extracted from the roast and ground coffee, when a beverage is prepared from the capsule in a beverage preparation apparatus. The liquid with dissolved coffee solids is lead from the capsule into a cup or other suitable container to provide a coffee beverage.

Caking of Beverage Compositions

In the production of conventional soluble, or instant, coffee, extraction of coffee beans is performed at high temperatures, e.g. 110-180° C., which results in the hydrolysis of complex long chain carbohydrates in the coffee beans, which are released into the extract as high molecular weight (HMW) material. This hydrolysis does not take place, or is very limited, when producing cold brew coffee wherein the extraction takes place at lower temperatures, e.g. at temperatures below 60° C., and this results in a lower content of HMW material as compared to conventional soluble coffee. The present inventors have found that a powder of dried coffee extract produced by extraction of coffee beans at temperatures below 60° C. tends to cake over time. This caking may take place during storage, especially at elevated temperatures, and may impact the preparation of a beverage when used in a beverage capsule. This is believed to be caused by low molecular weight (LMW) material and the low content of HMW material.

The inventors have found that when a powder of dried coffee extract produced by extraction of coffee beans at temperatures below 60° C. is mixed with roast and ground coffee, the tendency for caking of the coffee extract is greatly reduced. In a preferred embodiment of the invention the ratio by weight of the amount of roast and ground coffee to dried coffee extract in the beverage capsule is between 20:1 and 1:10, such as between 10:1 and 1:5, or between 5:1 and 1:1.

The effect of caking may also be reduced by removal of LMW material, e.g. by membrane filtration of the coffee extract. However, this may lead to increased cost and complexity of the production and may also lead to loss of other LMW compounds that are desired in the product, e.g. taste and aroma compounds. Consequently, in a preferred embodiment of the present invention the coffee extract obtained by extracting roast and ground coffee beans with water at a temperature below 60° C. has not been subjected to membrane filtration.

The present invention also relates to a method of producing a beverage composition of the invention. The method comprises i) roasting and grinding coffee beans; ii) extracting roast and ground coffee beans with water at a temperature below 60° C., and drying the liquid extract; and iii) mixing the ground coffee of step i) and dried coffee extract of step ii) into a beverage capsule. In a preferred embodiment of the method of the invention, the coffee extract obtained by extracting roast and ground coffee beans with water at a temperature below 60° C. is not subjected to membrane filtration. In a preferred embodiment, the roast and ground coffee beans are extracted in step ii) at a temperature between 2° C. and 50° C., such as between 2° C. and 40° C., between 5° C. and 40° C., or between 10° C. and 30° C. Aroma may be removed from the roast and ground coffee before extraction to avoid aroma losses and added back to the extract before drying, methods for removal of aroma are well known in the art of soluble coffee extraction, e.g. from WO 01/13735. The ratio by weight of the amount of roast and ground coffee to dried coffee extract being mixed in step iii) is preferably between 20:1 and 1:10, such as between 10:1 and 1:5, or between 5:1 and 1:1. The drying of the coffee extract in step ii) may be performed by any suitable method, preferably by freeze drying, spray drying, roller drying, belt drying, oven drying, vacuum oven drying or vacuum belt drying. To achieve the most efficient reduction of caking, the roast and ground coffee and the dried coffee extract is mixed together. Mixing may be performed by any suitable means, preferably achieving a homogenous mixing without destroying the particles of dried coffee extract.

In a further aspect, the invention relates to a method of producing a beverage capsule for use in a beverage preparation apparatus, wherein a beverage composition obtained by the method of the invention is filled into a beverage capsule.

In yet a further aspect, the invention relates to a method of producing a coffee beverage in a beverage preparation apparatus, wherein water is injected into a capsule according to any one of claims 1-5, and the beverage is released from the capsule into a container. Beverages machines suitable for injecting water into beverage capsules and allowing the release of the beverage into a container are well known in the art, and any suitable machine may be used. The injection of water may e.g. be performed by piercing the capsule with a hollow needle through which the water is injected. The release of the beverage may e.g. be achieved by opening means within the capsule that opens upon the injection of water and allows the beverage to flow into a container, or openings may be performed in the capsule allowing the release of the beverage. The beverage may be released into any suitable container, e.g. a cup, mug, jar, pot, or the like. The water injected into the capsule preferably has a temperature of between 2 and 30° C., more preferably between 10 and 25° C., such as to provide a cold or ambient beverage.

EXAMPLES

Example 1

Preparation of Dried Coffee Extract

Coffee beans were roast and ground. Coffee aroma was extracted from the roast and ground beans using a vacuum extraction process; the coffee aroma was stored for later reintroduction into the process.

The aroma-extracted roast and ground coffee was introduced into an extractor and the coffee solids extracted using water at a temperature of 25° C. using a water to coffee ratio of 4.0. Roast and ground coffee particles were removed from the extract by filtering.

The above obtained coffee extract then underwent a nanofiltration process using a semi-permeable membrane with a molecular weight cut-off of 1 kDa to remove low molecular weight compounds. The coffee aroma removed by vacuum extraction was reintroduced into the extract and the extract was freeze dried to produce a stable dried coffee extract powder.

Example 2

Preparation of Beverage Capsule

Dried coffee extract prepared as in example 1 was filled into beverage capsules and used in a beverage preparation machine. A coffee beverage was prepared using a beverage capsule containing 4 grams of the dried coffee powder using water at ambient temperature.

Example 3

Preparation of Beverage Capsule

Dried coffee extract prepared as in example 1 (1 gram) was blended with roast & ground coffee (4 grams) and the mixture filled into a beverage capsule for use with a beverage preparation machine. A high quality coffee beverage with high level of coffee aroma release was prepared with water at ambient temperature when using the beverage capsule in the coffee machine. Below table 3 shows sensory profile measured. The number indicates intensity value within a group of high/medium level.

Example 4

Sensory Test

The beverages prepare in example 1 and 2 and a control beverage prepare in the same way but from a beverage capsule containing 4 g of roast and ground coffee and no dried coffee extract, was compared in a sensory test. The intensity of different aroma attributes are shown in table 1.

TABLE 1

|  | Control | Example 1 | Example 2 |
| --- | --- | --- | --- |
| Overall intensity | 4- medium low | 5.5 - medium | 7 - high |
| Roasty | 4- medium low | 5.5 - medium | 7 - high |
| Fruity, coffee | 1.5 - low | 3 - low | 5 - medium |
| Acid | 3 - low | 5 - medium | 6 - medium high |
| Bitter | 4- medium low | 6 - medium high | 7 - high |
| Smooth | 9 - very high | 7 - high | 6 - medium high |
| Body | 4- medium low | 5.5 - medium | 7 - high |

Example 5

Stability of Coffee Powder

A coffee dried coffee extract was produced from roast and ground coffee beans. Coffee aroma was extracted from the roast and ground beans using a vacuum extraction process; the coffee aroma was stored for later reintroduction into the process.

The aroma-extracted roast and ground coffee was introduced into an extractor and the coffee solids extracted using water at a temperature of 25° C. using a water to coffee ratio of 4.0. Roast and ground coffee particles were removed from the extract by filtering. The coffee aroma removed by vacuum extraction was reintroduced into the extract and the extract was spray dried to produce a dried coffee extract powder.

3 samples were prepared for stability measurement:
A) The dried coffee extract prepared as described above
B) Roast and ground coffee beans
C) A mixture of 20% (weight/weight) of sample A) and 80% (weight/weight) of sample B The samples were filled into vials which were subsequently sealed to prevent moisture uptake. Vials of all 3 samples were then stored at different temperatures between 30 and 90° C. for 8 hours. The flowability of the powder in the vials was checked after 3 hours and 8 hours by manually shaking and observing the samples in the vials. Flowability was characterised after the following scale:

1: Flowable
2: Sticky
3: Caked

Results are shown in the table below:

| | Results after 3 h | | | | | | |
| --- | --- | --- | --- | --- | --- | --- | --- |
| | 30° C. | 40° C. | 50° C. | 60° C. | 70° C. | 80° C. | 90° C. |
| Sample B | 0 | 0 | 0 | 0 | 0 | 0 | 0 |
| Sample C | 0 | 1 | 1 | 2 | 2 | 2 | 2 |
| Sample A | 1 | 1 | 2 | 2 | 2 | 2 | 2 |

-continued

| | Results after 8 h | | | | | | |
|---|---|---|---|---|---|---|---|
| | 30° C. | 40° C. | 50° C. | 60° C. | 70° C. | 80° C. | 90° C. |
| Sample B | 0 | 0 | 0 | 0 | 0 | 0 | 0 |
| Sample C | 0 | 1 | 1 | 2 | 2 | 2 | 2 |
| Sample A | 1 | 1 | 2 | 2 | 2 | 2 | 2 |

It is seen that the presence of roast and ground coffee increases the stability of the coffee extract powder during storage at elevated temperatures.

The invention claimed is:

1. A method of producing a coffee beverage in a beverage preparation apparatus, the method comprising:
    providing a beverage capsule containing a dried roast and ground coffee mixture prepared by a process comprising the steps of:
        roasting and grinding coffee beans into roast and ground coffee beans,
        extracting a portion of the roast and ground coffee beans with water at an extraction temperature below 60° C. to form a liquid extract, and drying the liquid extract to form a dried coffee extract,
        mixing a remainder of the roast and ground coffee beans with the dried coffee extract to form the dried roast and ground coffee mixture, and
        filling a chamber of the beverage capsule with the dried roast and ground coffee mixture;
    inserting the beverage capsule into the beverage preparation apparatus which is adapted to receive the beverage capsule;
    heating, by the beverage preparation apparatus, water; and
    injecting, by the beverage preparation apparatus, the water into the beverage capsule to form the coffee beverage,
    wherein the water is injected into the beverage capsule at an injection temperature between 2° C. and 30° C.

2. The method of claim 1, wherein a ratio by weight of the remainder of the roast and ground coffee beans to the dried coffee extract is between 20:1 and 1:10.

3. The method of claim 1, wherein a ratio by weight of the remainder of the roast and ground coffee beans to the dried coffee extract is between 10:1 and 1:5.

4. The method of claim 1, wherein the portion of the roast and ground coffee beans are extracted at the extraction temperature between 2° C. and 40° C.

5. The method of claim 1, wherein the dried coffee extract obtained by extracting the portion of the roast and ground coffee beans with water at the extraction temperature below 60° C. is not subjected to membrane filtration.

* * * * *